Patented July 7, 1931

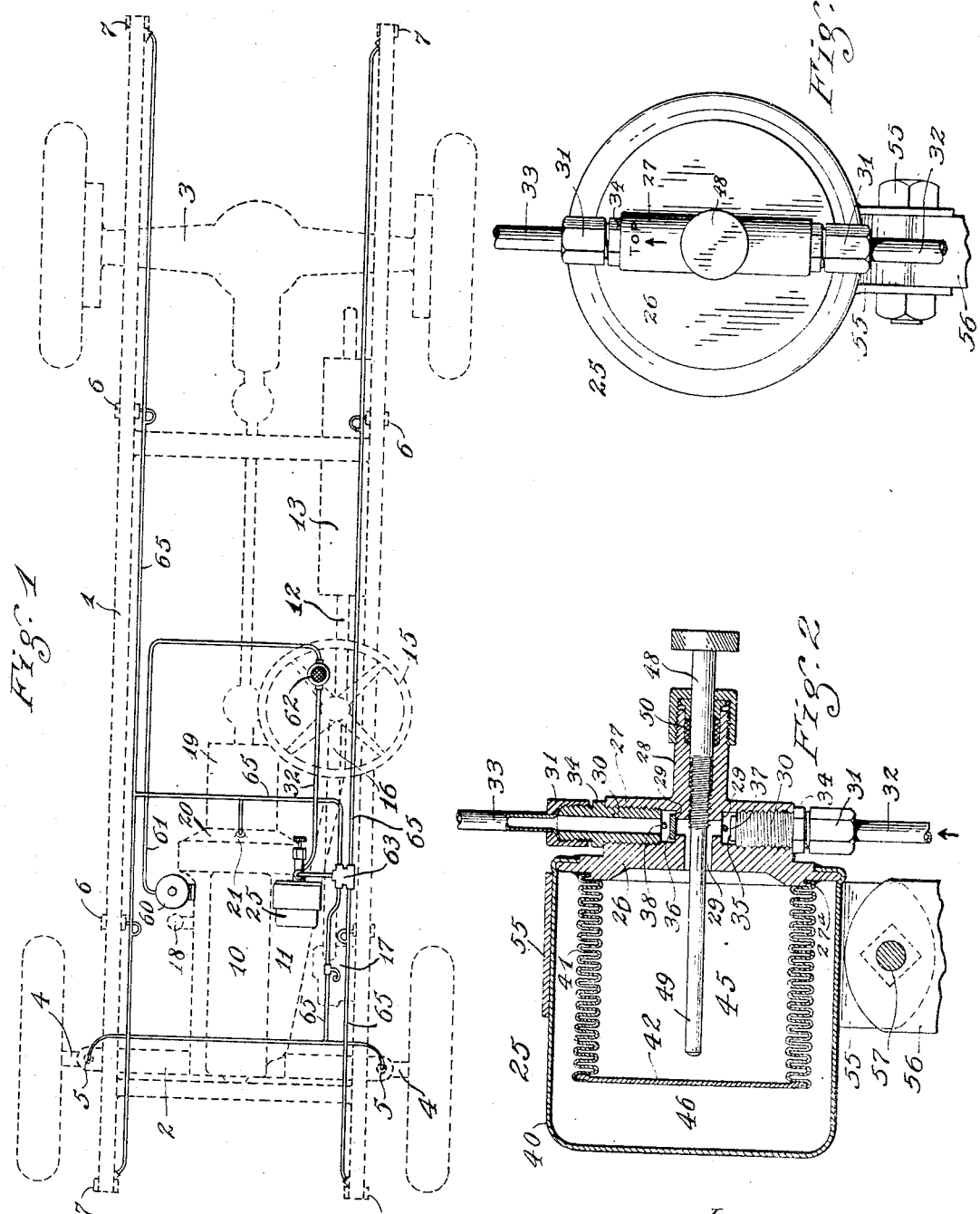

1,813,005

UNITED STATES PATENT OFFICE

BRENNAN B. WEST, OF CLEVELAND HEIGHTS, OHIO

AUTOMATIC LUBRICANT DISTRIBUTING MEANS

Application filed April 8, 1925. Serial No. 21,517.

This invention relates to lubricant distributing systems and more particularly to such as are used for delivering a suitable lubricant to the various parts of automotive vehicles requiring frequent lubrication.

I propose to use as the nucleus of the present embodiment of the invention the so-called "one shot" lubricating system that is used, for example, on the current model of the Cleveland automobile. Essentially this system consists of tubes or pipes leading to various parts of the mechanism of the automobile and through which oil may be forced by means of a suitable plunger pump that is located in convenient reach of the driver, as on the floor of the vehicle, where he may operate it with his foot.

It is the primary purpose of my invention to render such a system automatic of operation. In literature relating to the aforesaid "one shot" system, it is recommended that the driver, each time he steps into the car, depress the plunger of the pump and thus inject into the system a limited quantity of oil. Manifestly if this recommendation were followed literally in cases where the driver frequently leaves his car for comparatively short intervals of time, it would result in an unnecessary waste of oil. On the other hand, if the suggestion is not followed and the operation of the pump does not become a habit, so to speak, it is liable to be neglected. By my invention the human element is eliminated and oil is automatically forced through the system approximately in such quantities and at such intervals as will insure proper lubrication without waste. To this end I propose to incorporate in a lubricant distributing system a thermostatic pump located within the range of heat exchange of some part of the apparatus which fluctuates in temperature accordingly as the automobile is in use or, for a considerable period of time, is not in use. For example, I may locate the thermostatic element of the pump in or adjacent to the exhaust manifold of the engine, adjacent the exhaust pipe, or in or adjacent the muffler, where it will become hot and expand when the engine is running and will become cool and contract when the engine is at rest for a period long enough to permit the temperature of the aforesaid parts to drop materially.

Another object of the invention is to provide an adjustment for varying the quantity of lubricant discharged at each maximum stroke of the pump, this being desirable in view of the varying circumstances under which different vehicles are operated.

A further object of the invention is to use with the thermostatic pump a manually operated pump by means of which the initial supply of lubricant may be delivered to the system, and which may be used to augment the thermostatic pump under abnormal conditions, as when touring long distances with brief and infrequent recesses.

Again, and more generally, the object comprehended by my invention is the provision of a thoroughly reliable and durable, comparatively simple and inexpensive, automatic lubricant distributing system.

The foregoing objects, with other and more specific ones hereinafter appearing, are attained in the embodiment of the invention illustrated in the accompanying drawings wherein Fig. 1 is a more or less diagrammatic plan view of the chassis of a motor vehicle equipped with my automatic lubricant distributing system; Fig. 2 is a section through the thermostatic pump; and Fig. 3 is an end view of said pump, taken from the right of Fig. 2.

In Fig. 1, where the chassis of an automotive vehicle is conventionally represented by dotted lines, 1 represents the frame, 2 the front axle and 3 the rear axle. The front axle incorporates the usual steering knuckles 4 that are pivoted on the king bolts 5. The frame 1 is suspended from the axles 2 and 3 through the usual vehicle springs (not shown). The spring shackles are designated 6, and the connections between the front and rear ends of the side members of frame 1 and the springs are designated 7. The internal combustion engine, by means of which the vehicle is propelled, is designated 10, the exhaust manifold 11, and exhaust pipe 12, said pipe leading to a muffler 13. The steering wheel 15 is mounted on the steering column 16 which joins, at its lower end, the casing 17 of the steering gear. The filling spout through which oil is introduced into the crank case, of the engine is represented at 18, and in accordance with prevailing practice, the clutch (through which driving connection is established between the motor and the transmission gearing contained in a casing 19) is enclosed by a housing 20. This housing is equipped with a boss 21 through which lubricant is carried to the clutch bearing.

My automatic lubricant distributing system is shown in full lines in Fig. 1, and the thermostatic pump thereof is designated 25. As will appear more particularly from Fig. 2, this pump consists of a head 26 that is preferably circular in outline, the same being formed at its outer side with a transverse enlargement 27 and a central boss 28. The enlargement 27 and the boss 28 have bores which intersect, the inner end of the bore of the boss enlarging at 29 and opening through the inner surface of the head. The opposite ends of the enlargement 27 are counterbored to form shoulders 29 and are tapped to receive the threaded inner ends of fittings 30. These fittings are also threaded at their outer ends for the reception of sleeved nuts 31 by means of which the ends of pipes 32 and 33 are clamped to said fittings. Intermediate their threaded ends the fittitngs have wrench receiving portions 34.

Valves 35 and 36, which may be in the form of disks, occupy the inner ends of the counterbored portions of the enlargement 27. The valves 35 and 36 seat, respectively, upon the inner end of the fitting 30 and upon the shoulder 29 constituted of the bottom of the counterbore which said valve occupies. The valve 35 will be referred to as the "inlet valve" and the valve 36 as the "outlet valve". The former valve is prevented from lifting far enough off its seat to engage the adjacent shoulder 29 by a pin 37 which is extended through the enlargement 27 and a similar pin 38 prevents the outlet valve from seating against the adjacent end of the fitting 30.

Shown as formed about the periphery of the head 26 is the edge of a casing 40, and a diaphragm or metallic bellows 41 occupies this casing and has its end adjacent the head 26 secured to an annular bead 27ª of the head. The opposite end of te bellows is closed by a plate 42. The joints between the casing 40 and the head 26, and between the opposite ends of the bellows 41 and the parts to which they are connected, are hermetically sealed. The space enclosed by the bellows will be referred to as the pump chamber 45, while the space between the casing 40 and the bellows will be termed the thermostatic chamber 46. The latter chamber contains a highly volatile liquid so that it will be readily affected by changes in temperature. As the temperature rises, the contents of the chamber 46 expands and compresses the bellows; and as the temperature falls said contents contracts allowing the bellows to extend.

An adjusting screw 48 is threaded through the bore of the boss 28 and an extension of the screw projects into the pump chamber 45 where its inner end 49 serves as a stop for limiting the compression of the bellows 41. A stuffing gland 50 prevents leakage about the screw 48.

The pump may be supported by a metallic band 55 which surrounds the casing 40 and has its ends clamped to the opposite sides of a boss 56 by means of a bolt 57. This boss may be formed integral with the exhaust manifold 11, or it may be any convenient support for sustaining the pump in proximity to a part associated with the internal combustion engine and the temperature of which changes materially accordingly as the engine is running or is stopped for a considerable period of time. The pump should be installed with the enlargement 27 occupying a substantially vertical position and with the inlet valve 35 at the bottom. Such an installation may be facilitated by appropriately marking the top of the enlargement 27, as indicated in Fig. 3.

Located in a convenient position on the vehicle, as in the vicinity of the filling spout 18 of the crank case of the engine, is a reservoir 60, and a conduit or tube 61 leads therefrom to a plunger pump 62, which may be foot operated. Communication is established between this pump and the thermostatic pump 25 through the previously mentioned pipe 32. The pipe 33 leads from the outlet side of the thermostatic pump to a distributing device 63, such as is used in the "one shot" system previously referred to. From the device 63, tubes 65 lead to the shackle bolts 6, spring connections 7, king bolts 5, steering gear casing 17, the boss 21 of the clutch casing 20, and to any other parts of the chassis which it is desired to lubricate by means of the automatic system.

The reason for locating the reservoir 60 adjacent the filling spout 18 is to facilitate the filling of it and to make more certain the keeping of it supplied with lubricant. Each time the crank case is filled with oil, the reservoir may be inspected and if a supply of lubricant is needed therein, it may be attended to at the same time.

When the system is first installed, the reservoir 60 is filled and the plunger pump 62 is operated to fill the entire system, and to deliver a quantity of lubricant to all parts to which the distributing pipes lead. The pump chamber 45 may be filled before the pump is emplaced, or at the time the system is filled, as just described, by removing the adjusting screw 48 and temporarily substituting therefor a suitably shaped vent tube, as will be readily understood. Thereafter, each time the engine becomes heated, the contents of the chamber 46 expands and forces a quantity of lubricant through the system, such quantity depending upon the capacity of the pump chamber as determined by the adjustment of the screw 48. When the engine is stopped and becomes relatively cool, the contents of the chamber 46 contracts, allowing the bellows 41 to elongate and draw lubricant in through the tube 32 past the valve 35 to replace that discharged on the previous contraction of the bellows.

The screw 48 may be set to cause the pump to deliver an amount of lubricant to the system each time it operates according to the demands of the particular case. Obviously the pump stroke should be longer in cases where the engine heats and cools only two or three times during the course of a day, than when the engine is being started and stopped frequently with sufficient time intervals to permit of the engine cooling considerably.

In case the thermostatic pump fails to deliver sufficient lubricant to keep all parts properly supplied while running the vehicle under abnormal conditions, the plunger pump 62 may be resorted to for injecting additional lubricant into the system. The presence of the thermostatic pump will in no way affect the passage of the lubricant from the plunger pump to the distributing pipes.

Having thus described my invention, what I claim is:—

1. The combination of a chamber adapted to contain an expansible and contractible medium and designed to be subjected to the action of the hot exhaust gases of an internal-combustion engine, piping means equipped with a check-valve to deliver lubricant expelled from said chamber by the expansion of said medium, and piping means fitted with a check-valve to permit the contraction of said medium to draw lubricant into said chamber.

2. In a lubricant distributing system for use on vehicles propelled by power plants in the normal operation of which heat is generated, the combination of a lubricant container, conduits through which the lubricant is deliverd to various parts of the vehicle, a pump for transferring the lubricant from the container to the conduits, and thermosensitive means for operating the pump, said means being subjected to and energized by the heat generated by the power plant.

3. In a lubricant distributing system for use on vehicles propelled by power plants in the normal operation of which heat is generated, the combination of a lubricant container, conduits through which the lubricant is delivered to various parts of the vehicle, a pump comprising an expansible and contractible chamber for transferring the lubricant from the container to the conduits, and thermostatic means subjected to the heat generated by the power plant for effecting the expansion and contraction of said chamber.

4. In a lubricant distributing system for use on vehicles propelled by power plants in the normal operation of which heat is generated, the combination of a lubricant container, conduits through which the lubricant is delivered to various parts of the vehicle, a pump for transferring the lubricant from the container to the conduits, and an expansible and contractible chamber containing a thermosensitive medium subjected to the heat generated by the power plant for effecting the operation of the pump.

5. In a lubricant distributing system for use on vehicles propelled by power plants in the normal operation of which heat is generated, the combination of a lubricant container, conduits through which the lubricant is delivered to various parts of the vehicle, a diaphragm pump for transferring the lubricant from the container to the conduits, and thermostatic means subjected to the heat generated by the power plant for operating the pump.

6. In a lubricant distributing system for use on vehicles propelled by power plants in the normal operation of which heat is generated, the combination of a lubricant container, conduits through which the lubricant is delivered to various parts of the vehicle, a pump for transferring the lubricant from the container to the conduits, and a diaphragm chamber containing a thermosensitive medium subjected to the heat generated by the power plant for operating the pump.

7. The combination of a chamber adapted to contain a lubricant and an expansible and contractible medium and designed to be subjected to the action of the hot exhaust gases of an internal combustion engine, a diaphragm separating the portion of the casing occupied by the expansible and contractible medium from that adapted to contain the lubricant, piping means equipped with a check valve to deliver lubricant expelled from said chamber by the expansion of said medium, and piping means fitted with a check valve to permit the contraction of said medium to draw lubricant into said chamber, said diaphragm yielding to the action of said medium.

8. In a lubricant distributing system for use on vehicles propelled by internal combustion engines, the combination of a lubricant container, a pump in communication therewith, conduits through which a lubricant is conducted from the pump to various parts of the vehicle, thermostatic means subjected to heat generated by the engine for operating the pump, and a manually operated pump for delivering lubricant to the conduits.

9. In a lubricant distributing system for use on vehicles propelled by internal combustion engines, the combination of a lubricant container, a pump in communication therewith, conduits through which a lubricant is conducted from the pump to various parts of the vehicle, thermostatic means subjected to heat generated by the engine for operating the pump, and a manually operated pump fer delivering lubricant from the container to the former pump and through the same to the conduits.

10. In a lubricant distributing system for use on vehicles propelled by internal combustion engines, the combination of a lubricant container, a manually operated pump communicating with said container, a second pump communicating with the lubricant container through the former pump, conduits through which a lubricant is conducted from the second mentioned pump to various parts of the vehicle, and thermostatic means subjected to heat generated by the engine for operating the second mentioned pump.

11. In a lubricating system of the class set forth, the combination of distributing conduits, a source of lubricant supply, two pumps in series for transferring lubricant from the source to the distributing conduits, and means for automatically operating one of said pumps, the other of said pumps being manually operated, each pump when functioning serving to move the lubricant through the other pump.

In testimony whereof, I hereunto affix my signature.

BRENNAN B. WEST.